United States Patent [19]

Gianchandai et al.

[11] Patent Number: 4,997,612
[45] Date of Patent: Mar. 5, 1991

[54] POLYPHENYLENE ETHER-POLYAMIDE COMPOSITION

[75] Inventors: Jay K. Gianchandai, Maplewood; William Wootton, Ravena, both of N.Y.

[73] Assignee: GE Plastics, Selkirk, N.Y.

[21] Appl. No.: 347,105

[22] Filed: May 3, 1989

[51] Int. Cl.$^5$ .................... C08L 71/12; D01F 1/02
[52] U.S. Cl. .................... 264/211; 264/313; 264/319; 524/275; 524/340; 524/394; 524/494; 525/68; 525/92; 525/391; 525/392; 525/396; 525/397; 525/905
[58] Field of Search .................... 264/211, 313, 319; 524/275, 340, 394, 494; 525/68, 92, 391, 392, 396, 397, 905

[56] References Cited

U.S. PATENT DOCUMENTS

| 4,315,086 | 2/1982 | Ueno et al. | 525/391 |
| 4,600,471 | 7/1986 | Agcock et al. | 525/397 |
| 4,668,723 | 5/1987 | Bussink et al. | 525/905 |
| 4,680,329 | 7/1987 | Brown et al. | 524/394 |
| 4,877,568 | 10/1989 | Austin | 264/211 |

Primary Examiner—Jacob Ziegler
Attorney, Agent, or Firm—Francis T. Coppa

[57] ABSTRACT

Thermoplastic compositions comprising polyphenylene ether resin and polyamide resin are disclosed. The compositions further include a compatibilizer component, and an additive combination which includes both a metal stearate and an amide compound.

25 Claims, No Drawings

POLYPHENYLENE ETHER-POLYAMIDE COMPOSITION

This invention relates generally to thermoplastic compositions, and more particularly to polyphenylene ether-polyamide compositions having unexpectedly improved properties because of the presence of certain additional components.

Compositions containing a combination of polyphenylene ether resin (sometimes referred to as PPE or PPO ® resin) and polyamides have attracted interest because of the potential for molded products which exhibit the most desirable properties of each material, i.e., outstanding heat resistance and dimensional stability from PPE, and excellent strength and chemical resistance from the polyamide. Exemplary disclosures of such compositions are found in U.S. Pat. Nos. 4,659,760 (van der Meer), 4,732,938 (Grant et al), and 4,315,086 (Ueno et al). The properties of blends of PPE and polyamide are often enhanced by the addition of flow modifiers, impact modifiers, fillers, and certain compounds which appear to compatibilize the base resins.

PPE-polyamide compositions are usually amenable to many different types of processing operations, such as extrusion, compression molding, and injection molding. However, under certain conditions, final products resulting from the operations exhibit some defects. For example, injection molding of these compositions at high temperatures, e.g., above about 250° C., sometimes results in surface imperfections on the molded article which often become magnified when the surface is painted. Furthermore, high temperature processing sometimes has an adverse effect on the impact strength of the articles.

It appears that some of the surface imperfections are due to polyamide residue which adheres to and hardens on the molding apparatus. Thus, an additional undesirable result is the loss in material processing time and efficiency when the mold operator shuts down the equipment to remove the residue.

It is therefore apparent that a need exists for a PPE-polyamide composition which exhibits a wide range of desirable properties when formed into articles, but which substantially eliminates the deficiencies described above.

SUMMARY OF THE INVENTION

The situation described above has been addressed by the discovery of an improved thermoplastic composition which comprises:
(1) A thermoplastic composition comprising:
(A) about 20% by weight to about 80% by weight of polyphenylene ether;
(B) about 80% by weight to about 20% by weight of a polyamide;
(C) about 0.05% to about 4% by weight, based on the weight of the entire composition, of a compatibilizing compound for the polyphenylene ether and the polyamide; and
(D) about 0.05% to about 2% by weight, based on the weight of the entire composition, of an additive combination which itself comprises
  (i) at least one metal stearate, and
  (ii) at least one amide selected from the group consisting of primary amides, secondary amides, and alkylenebisamides.

DETAILED DESCRIPTION OF THE INVENTION

Polyphenylene ether resins suitable for this invention are well-known in the art and described, for example, in U.S. Pat. Nos. 3,306,874; 3,306,875; and 3,432,469 of Allan Hay; and U.S. Pat. Nos. 3,257,357 and 3,257,358 of Gelu Stamatoff, all incorporated herein by reference. Many PPE resins are also described in two applications for B. Brown et al., Ser. Nos. 210,547 and 210,266, both filed on June 23, 1988 by the assignee of the present invention and incorporated herein by reference. Both homopolymer and copolymer polyphenylene ethers are within the scope of this invention.

The preferred polyphenylene ether resins comprise a plurality of structural units having the formula

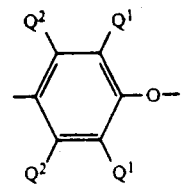

In each of said units independently, each $Q^1$ is independently halogen, primary or secondary lower alkyl (i.e. alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Especially preferred polyphenylene ethers will be comprised of units derived from 2,6-dimethyl phenol; or copolymers comprised of units derived from 2,6-dimethyl phenol and 2,3,6-trimethyl phenol.

The particular polyamide used for this invention is not critical; most are well-known in the art.

Furthermore, the polyamides may be made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. The dicarboxylic acid may be used in the form of a functional derivative thereof, for example, an ester or acid chloride. A detailed description of polyamides and polyamide precursor materials is provided in U.S. Pat. No. 4,755,566, issued to J. Yates, III, the entire contents of which are incorporated herein by reference. Other descriptions of suitable polyamides (often referred to as "Nylons") are provided in U.S. Pat. Nos. 4,732,938

(Grant et al), 4,659,760 (van der Meer), and 4,315,086 (Ueno et al), each also incorporated herein by reference.

Specific examples of polyamides are polyamide-6, 66, 11, 12, 63, 64, 6/10 and 6/12, as well as polyamides prepared from terephthalic acid and/or isophthalic acid and trimethylhexamethylenediamine; from adipic acid and m-xylylenediamines; from adipic acid, azelaic acid and 2,2-bis-(p-aminocyclohexyl)propane, and from terephthalic acid and 4,4'-diaminodicyclohexylmethane. Mixtures and/or copolymers of two or more of the foregoing polyamides or prepolymers thereof, respectively, are also within the scope of the present invention.

The polyamide used may also be one or more of those referred to as "toughened nylons", which are often prepared by blending one or more polyamides with one or more polymeric or copolymeric elastomeric toughening agents. Examples of these types of materials are given in U.S. Pat. Nos. 4,174,358; 4,474,927; 4,346,194; 4,251,644; 3,884882; 4,147,740; all incorporated herein by reference, as well as in a publication by Gallucci et al, "Preparation and Reactions of Epoxy-Modified Polyethylene", J. APPL. POLY. SCI., V. 27, PP. 425-437 (1982).

The preferred polyamides for this invention are polyamide-6; 6,6; 11 and 12, with the most preferred being polyamide-66.

The weight ratio of PPE to polyamide may vary from about 20:80 to about 80:20, with a ratio in the range of about 40:60 to 60:40 being preferred.

Component (C) of the compositions of this invention is a compound which improves the compatibility between the polyphenylene ether and polyamide resins. Improved compatibility is manifested by better processability, impact strength and/or elongation, or appearance, as compared to compositions without this component. These compounds are generally known in the art, and are usually either premixed with one of the base polymers or added separately to the composition at some point prior to or during blending.

Compatibilizing compounds suitable for use herein generally fall into the following categories:
(a) compounds which contain both (i) an ethylenic carbon-carbon double bond or a carbon-carbon triple bond and (ii) a carboxylic acid, acid anhydride, acid amide, imide, carboxylic ester, amine, or hydroxyl group;
(b) liquid diene polymers;
(c) epoxy compounds;
(d) polycarboxylic acids or derivatives thereof;
(e) an oxidized polyolefin wax;
(f) a compound containing an acyl functional group;
(g) a polyphenylene ether modified with a compound containing an acyl functional group; and
(h) a chloroepoxytriazine compound.

Examples of subclass (a) compatibilizers are provided in the Ueno et al patent mentioned above, and include, for example, maleic anhydride, maleic acid, fumaric acid, maleimide, maleic hydrazide, as well as reaction products of a diamine with these materials.

Examples of subclass (b) compatibilizers are also provided in the Ueno et al patent, and include, for example, homopolymers of a conjugated diene and copolymers of the conjugated diene and at least one member selected from the group consisting of other conjugated dienes, olefins, aromatic vinyl compounds, and acetylenic compounds. Specific examples include homopolymers of butadiene or of isoprene.

The epoxy compounds of subclass (c) include, for example, epoxy resins produced by condensing polyhydric phenols and epichlorohydrin in different proportions, as well as glycidyletherified products of monohydric phenols or monohydric alcohols. Ueno et al provides further examples of these types of materials.

In regard to subclass (d), the polycarboxylic acid or derivative thereof which is suitable for this invention is usually one represented by the formula

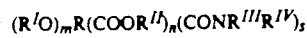

or derivatives thereof wherein R is a linear or branched chain, saturated aliphatic hydrocarbon of from 2 to 20 carbon atoms; $R^I$ is selected from the group consisting of hydrogen or an alkyl, aryl, acyl or carbonyl dioxy group of from 1 to 10 carbon atoms; each $R^{II}$ is independently selected from the group consisting of hydrogen or an alkyl or aryl group of from 1 to 20 carbon atoms; each $R^{III}$ and $R^{IV}$ is independently selected from the group consisting of hydrogen or an alkyl or aryl group of from 1 to 10 carbon atoms; m is equal to 1 and (n+s) is greater than or equal to 2, and n and s are each greater than or equal to 0; and wherein ($OR^I$) is alpha or beta to a carbonyl group and at least 2 carbonyl groups are separated by 2 to 6 carbon atoms.

Preferred compounds of this type are citric acid, malic acid, and salts and hydrates thereof, as described in pending application Ser. No. 183,494 filed 4/14/88, the contents of which are incorporated herein by reference.

Acid esters, e.g., those derived from polycarboxylic acids, may also be used in this invention. Examples are acetyl citrate and mono- and distearyl citrates.

Acid amides may also be used, such as N,N'-diethyl citric acidamide.

Examples of suitable derivatives of the polycarboxylic acid are the salts thereof, including the salts with amines and, preferably, the alkali and alkaline metal salts. Illustrative salts include calcium malate, calcium citrate, potassium malate, and potassium citrate. Pending application Ser. No. 312,316, filed 2/16/89 and also incorporated herein by reference, describes many of these compounds.

Examples of subclass (e) are found in U.S. Pat. No. 4,659,760, issued to R. van der Meer, and incorporated herein by reference. One example is an oxidized polyethylene wax. Organic phosphites are sometimes used in conjunction with the wax.

Examples of subclass (f) are compounds described in U.S. Pat. Nos. 4,642,358 and 4,600,741, issued to D. Aycock et al, each of which is incorporated herein by reference. Nonlimiting examples include chloroformylsuccinic anhydride, chloroethanoylsuccinic anhydride, trimellitic anhydride acid chloride, 1-acetoxy acetyl-3,4-dibenzoicacid anhydride, and terephthalic acid acid chloride.

Examples of subclass (g) are also found in the Aycock et al patents mentioned above, and include the acyl functional-type compounds mentioned above which have been reacted with a portion of a PPE resin.

Examples of subclass (h) are compounds described in application Ser. No. 144,901, filed 1/19/88, the contents being incorporated herein by reference. Furthermore, the applications corresponding to Ser. Nos. 210,266 (filed 6/23/88) and 210,547 (filed 6/23/88) are generally relevant to these types of materials, and are therefore also incorporated herein by reference.

Methods of preparing and using these compatibilizing compounds are generally known in the art, and are described, for example, in the references mentioned above.

The compatibilizing compound is present in an amount sufficient to improve the compatibility between the various components in the composition. In general, the amount of compatibilizing compound will be up to about 4% by weight, and preferably from about 0.05% to 4% by weight, based on the weight of the entire composition. The most preferable range is usually from about 0.1% to 2% by weight.

The composition of this invention includes as Component (D) an additive combination which itself comprises:

(i) at least one metal stearate; and (ii) at least one amide selected from the group consisting of primary amides, secondary amides, and alkylenebisamides.

The metal stearate is preferably zinc stearate, calcium stearate, aluminum stearate, cerium stearate, or magnesium stearate, with zinc stearate being most preferred. The stearates are available commercially, and their preparation is also generally known in the art.

The amide compounds employed in this invention are available commercially. The primary amides are usually those based on fatty saturated and unsaturated straight-chain, monobasic acids derived from naturally occurring feedstocks, while the secondary amides are usually products of the reaction of saturated and unsaturated fatty acids with saturated and unsaturated primary amines. The alkylenebisamides (for example, the ethylenebisamides) are usually reaction products of saturated or unsaturated fatty acids and alkylenediamines.

Examples of suitable amides are those selected from the group consisting of stearamide, behenamide, oleamide, erucamide, stearyl erucamide, erucyl erucamide, oleyl palmitamide, stearyl stearamide, erucyl stearamide, N,N'-ethylenebisstearamide, and N,N'-ethylenebisoleamide. The preferred amides are those based on erucamide or derivatives thereof, such as stearyl erucamide, erucyl erucamide, erucyl stearamide, and erucamide itself, with stearyl erucamide being most preferred.

The appropriate amount of metal stearate/amide additive combination will depend on several factors, including the particular PPE and polyamide employed, as well as the molding conditions being used. Usually, the additive combination will be present at about 0.05% to about 2% by weight, based on the weight of the entire composition. A preferred range, especially when polyamide 6,6 is present in the composition, is about 0.5% to about 1.25% by weight.

The ratio of metal stearate to amide also depends in part on some of the factors mentioned above. In preferred embodiments, the amount of metal stearate is greater than 50% of the total amount of the additive combination. Usually, the weight ratio of metal stearate to amide ranges from about 80:20 to about 60:40.

It is sometimes useful (for example, when increased polymer flow is desired) to include a styrene resin in compositions of this invention. Examples of styrene resins can be found in U.S. Pat. No. 4,600,741 of D. Aycock et al, incorporated herein by reference, and include homopolymers such as polystyrene, as well as the high impact polystyrenes, which have been modified by a natural or synthetic rubber, e.g., polybutadiene, polyisopreen, butyl rubber, EPDM rubber, ethylenepropylene copolymers, styrene-butadiene rubbers, and the like. Styrene-containing copolymers such as styrene-acrylonitrile copolymers (SAN), styrene-butadiene copolymers, and styrene-acrylonitrile-butadiene terpolymers (ABS) may be used, as well as poly-alpha-methylstyrene, copolymers of ethylvinyl benzene and divinylbenzene, and the like. Blends of these materials are also suitable.

The styrene resin is usually employed at a level of about 1%-30% by weight, based on the weight of the entire composition. The selection of a specific amount will of course depend in part on processing conditions and end use requirements for the compositions. The high impact polystyrenes are often used at levels of about 10%-20% by weight.

In some embodiments of this invention, elastomeric (i.e., rubbery) materials are employed, often to enhance the impact strength of articles formed from these compositions. Such materials are well-recognized in the art. They are usually of high molecular weight, and include natural rubber and thermoplastic elastomers. They may be homopolymers as well as copolymers, including random, block and graft copolymers derived from various suitable monomers such as butadiene, possibly in combination with a vinyl aromatic compound like styrene.

A preferred class of elastomeric block copolymers are the random, block, and graft copolymers of vinyl aromatic compounds and conjugated dienes. Examples of these materials are hydrogenated or non-hydrogenated block copolymers of the A-B-A and A-B type, wherein A is polystyrene and B is an elastomeric diene, e.g. polybutadiene, radial teleblock copolymers of styrene and a conjugated diene, acrylic resin modified styrene-butadiene resins, and the like; and graft copolymers obtained by graft-copolymerization of a monomer or monomer mix containing a styrenic compound as the main component to a rubber-like polymer. The rubber-like polymer used in the graft copolymer can include polybutadiene, styrene-butadiene copolymer, acrylonitrile-butadiene copolymer, ethylene-propylene copolymer, polyacrylate, and the like. The styreneic compounds include styrene, methylstyrene, dimethylstyrene, isopropylstyrene, alpha-methylstyrene, ethylvinyltoluene and the like. The monomer which may be used together with the styrenic compound includes, for example, acrylate, methacrylate, acrylonitrile, methacrylonitrile, methacrylic acid, acrylic acid, and the like.

A very suitable block copolymer for this invention is a diblock or triblock copolymer of styrene and at least one olefin or conjugated diene, any conjugated diene block being non-hydrogenated, partially hydrogenated, or entirely hydrogenated. Of this type, the most preferred copolymer is either a styrene-butadiene diblock or styrene-butadiene-styrene triblock copolymer.

The amount of rubbery material used depends on end use requirements, and is usually present at about 1%-30% by weight, based on the weight of the entire composition. Most often, the level of rubbery material present is in the range of about 5%-20% by weight.

Compositions of this invention may also include reinforcing agents such as fibrous glass and/or graphite; as well as mineral fillers such as mica, talc, and clay. When used, glass fibers are usually present at a level of about 1% by weight to about 40% by weight, based on the weight of the entire composition.

Other ingredients can also be included in these compositions, in effective amounts. Examples are plasticizers, colorants, dyes, flame retardants, antioxidants, pigments, and drip retardants. Special mention is made here of stabilizers which inhibit oxidation or thermal degradation of the compositions. Hindered polyphenols are illustrative.

In terms of general suitability, a very suitable composition according to this invention when injection molding at high temperatures comprises:
(a) about 20%-50% polyphenylene ether resin;
(b) about 20%-50% polyamide resin;
(c) about 1%-15% elastmeric block copolymer;
(d) about 0.1%-1.5% compatibilizing compound;
(e) about 1%-20% styrene resin; and
(f) about 0.05%-2.0% of an additive combination which consists essentially of at least one metal stearate and at least one primary amide, secondary amide, or alkylenebisamide,
each component in the composition measured in terms of percent-by-weight, based on the weight of the entire composition.

In general, compositions of this invention are prepared by melt blending the various ingredients. Mixing times and temperatures can be determined according to the particular materials being used. The temperature is usually in the range of 270° C. to 350° C. A prolonged time and/or shear rate is desirable for mixing, with the proviso that substantial degradation of the resins be avoided.

Any of the melt-blending methods which can accommodate molten viscous masses may be used. Furthermore, batch or continuous systems are possible. Specifically, extruders, Bambury mixers, rollers, kneaders, and the like may be employed.

In general, all of the ingredients may be initially and directly added to the processing system, with the proviso that the metal stearate/amide additive be kept out until the PPE resin and polycarboxylic acid component are mixed into the system. Preferably, the metal stearate/amide additive is premixed with the polyamide.

Furthermore, it appears that certain physical properties, such as impact strength and elongation, are enhanced by initially precompounding the PPE with the compatibilizing agent prior to blending with the polyamide. This precompounding may be done in two steps, wherein the compatibilizing agent and the PPE are melt-extruded to form pellets which are then blended through extrusion with the polyamide. One can employ an extrusion apparatus or melt blending apparatus wherein the PPE and compatibilizing agent are fed at the throat of the screw, and the polyamide is subsequently added to the extrusion system in a downstream feed port. In this technique, the compatibilizing agent and PPE are in a molten state when the polyamide is added.

In regard to the other ingredients of the compositions, all ingredients may be directly added to the processing system; or else certain additives may be precompounded with each other or with either polymer component, although the effect of any mixing sequence on the metal stearate/amide additive should be monitored.

Relevant preparation techniques are also discussed in U.S. Pat. No. 4,822,836, issued to R. Wroczynski, and in pending application Ser. No. 312,316, filed on 2/16/89, the contents of each being incorporated herein by reference.

Therefore, another embodiment of this invention is an improved method for extruding PPE-polyamide compositions, which comprises mixing at least one PPE resin with at least one compatibilizing agent in an extruder as described above, followed by the optional addition of other components described above, and then adding to the extruder at least one polyamide and an additive combination which comprises:
(i) at least one metal stearate, and
(ii) at least one amide as described above.

Use of this unique method results in higher polymer processing times because of the absence of residue buildup on the extruder, while also resulting in a product with improved physical properties, as described in the examples which follow.

EXAMPLES

Unless otherwise indicated below, the following materials were used in the examples:
(A) Polyphenylene Ether (PPE): A poly(2,6-dimethyl-1,4-phenylene) ether resin having a number average molecular weight of about 20,000, and an intrinsic viscosity in chloroform at 25° C. of about 0.4 dl/g.
(B) Polyamide 6,6: Available form Monsanto Chemical Company as grade VYDYNE 21.
(C) Polycarboxylic Acid: Citric acid monohydrate.
(D) Erucamide: Kemamide E-180, available from Humko Chemical Company, consisting essentially of stearyl erucamide.
(E) Polyamide compound: Uni-Rez 2666, available from Union Camp Corporation: a fatty acid dimer-based polyamide resin.
(F) Metal Stearate: Zinc stearate, available as grade RSN 131 from Mallinkrodt Company.
(G) Metal Stearate: Calcium stearate, available as Calcium Stearate Regular, from Witco Company.
(H) Metal Stearate: Aluminum stearate, available as Aluminum Stearate 22 from Witco Company.
(I) Metal Stearate: Cerium stearate, available from Rhone-Poulenc Inc.
(J) Metal Stearate: Magnesium stearate, available as magnesium stearate D from Witco Company.
(K) Elastomeric Block Copolymer: Styrene-Butadiene-Styrene block copolymer, available as KRATON D-1102 from Shell Chemical Company.
(L) Polystyrene: Rubber-modified polystyrene (referred to here as HIPS), available as Mobil 1800 from Mobile Corporation.
(M) Antioxidant-type Additive: Irganox 1076, a hindered polyphenol available from Ciba Geigy Company.
(N) Pigment: Carbon Black M-800, from Cabot Corporation.

In each example, the constituents were combined by blending in melt form and then feeding the blend to a 30 mm Werner and Pfleiderer twin screw extruder, except that the polyamide was premixed with the metal stearate and amide components, and then added to a downstream port on the extruder.

The successive extruder zone temperatures were as follows:

550° F., 560° F., 550° F., 550° F. The extruder melt temperature was 550° F.-600° F. Residence time was 20-30 seconds, and throughput was approximately 40 lbs/hour.

The extrudate was cool-water quenched and then pelletized. The compositions were then molded into test specimens on a 175 ton, 8 oz. shot size Toshiba molding machine. Sample 1 specimens fall within the scope of this invention.

EXAMPLE 1

The following composition was prepared as described above:

| Component | Parts by Weight |
|---|---|
| PPE | 36 |
| Polyamide 6,6 | 39 |
| Block Copolymer | 9 |
| Citric Acid | 1.0 |
| HIPS | 15 |
| IRGANOX 1076 | 0.3 |
| Carbon Black | 0.5 |
| Kemamide E-180 | 0.25 |
| Zinc Stearate | 0.50 |

A control sample, 1A, was prepared in the same manner, but with the omission of Kemamide E-180 and the zinc stearate.

Tests on molded pieces resulted in the following properties:

TABLE 1

| Property | Sample 1 | 1A[a] |
|---|---|---|
| Heat Distortion Temperature[b] (66 psi) | 312° F. | 301° F. |
| Izod Impact Strength (ft. lb/in)[c] | 7.7 | 2.6 |
| Dynatup Impact Strength[d] | 531 in-lbs | 245 in-lbs |
| Elongation at Breakage[e] | 50.1% | 41.7% |
| Tensile Strength (yield)[f] | 8266 psi | 8090 psi |

[a] CONTROL
[b] ASTM D 648
[c] ASTM D 256
[d] ASTM D 790
[e] ASTM D 638

Table 1 demonstrates that use of the metal stearate/amide additive combination results in good impact strength and elongation. Furthermore, when sample 1 material was repeatedly injection-molded, there was little evidence of residue on the mold surfaces.

EXAMPLE 2

Various combinations of metal stearates and fatty acid amides were examined in compositions in which the other components were similar to those of Example 1. Table 2 sets forth the materials, while Table 3 lists the resulting properties after tests similar to those of Example 1 were performed.

TABLE 2

| | Sample Number | | | | | | | | | |
|---|---|---|---|---|---|---|---|---|---|---|
| | 2 | 3 | 4 | 5 | 6 | 7 | 8 | 9 | 10 | 11 |
| Base[a] Material | 100.8 | 100.8 | 100.8 | 100.8 | 100.8 | 100.8 | 100.8 | 100.8 | 100.8 | 100.8 |
| Kemamide E-180 | — | 0.25 | 0.25 | 0.25 | 0.25 | — | — | — | — | 0.50 |
| Unirez 2666 | — | — | — | — | — | 0.50 | 0.50 | 1.0 | 1.0 | — |
| Calcium Stearate | — | 0.25 | — | — | — | 0.50 | — | 0.50 | — | — |
| Zinc Stearate | — | — | 0.25 | 0.50 | — | — | 0.50 | — | 0.50 | — |
| Aluminum Stearate | — | — | — | — | 0.25 | — | — | — | — | — |
| Cerium Stearate | — | — | — | — | — | — | — | — | — | 0.50 |

[a] As in Example 1, but excluding the metal stearate and erucamide. All amounts are in parts-by-weight (pbw).

TABLE 3

| Sample # | HDT (°F.) | Izod (ft lb/in) | Impact[b] Energy | Elongation at Breakage % | Tensile Strength (Yield) | Tensile Strength (Ultimate) |
|---|---|---|---|---|---|---|
| 2[a] | 301 | 2.6 | 245 D | 41.7 | 8090 | 7916 |
| 3 | 307 | 3.6 | 348 D | 48.1 | 8382 | 7964 |
| 4 | 309 | 4.9 | 419 D | 44.3 | 8293 | 7907 |
| 5 | 312 | 7.7 | 531 D | 50.1 | 8266 | 7841 |
| 6 | 309 | 4.1 | 476 D | 46.9 | 8323 | 7906 |
| 7 | 311 | 2.3 | 215 B | 36.8 | 8807 | 8176 |
| 8 | — | 3.1 | 318 B | 44.3 | 8542 | 7999 |
| 9 | — | 1.2 | 56 B | 15.9 | 8378 | 8233 |
| 10 | — | 1.3 | 88 B | 17.2 | 8455 | 8270 |
| 11 | — | 4.0 | 645 D | 52.2 | 8589 | 7993 |

[a] CONTROL (No Erucamide/Metal Stearate)
[b] "D" = Ductile Fracture
"B" = Brittle Fracture Table 3 demonstrates the improvement in impact properties when the amide/metal stearate additive is employed. It should be noted that improvements in impact properties may be shown by way of either Izod impact strength or other impact measurements, although the values do not always correspond to each other.

Samples which included the Uni-Rez compound did not exhibit good impact properties, and are outside the scope of this invention.

Those skilled in the art realize that various modifications and variations of the present invention are possible in light of the above teachings. It should therefore be understood that changes may be made in particular embodiments of this invention which are still within the full scope of the disclosure as defined by the following claims.

We claim:
1. A thermoplastic composition comprising:
   (A) about 20% by weight to about 80% by weight of polyphenylene ether;
   (B) about 80% by weight to about 20% by weight of a polyamide;
   (C) about 0.05% to about 4% by weight, based on the weight of the entire composition, of a compatibilizing compound for components (A) and (B); and
   (D) about 0.05% to about 2% by weight, based on the weight of the entire composition, of an additive combination which itself comprises
      (i) at least one metal stearate, and
      (ii) at least one amide selected from the group consisting of primary amides, secondary amides, and alkylenebisamides.
2. The composition of claim 1 wherein the polyphenylene ether comprises a plurality of structural units having the formula

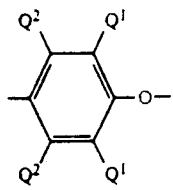

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q_1$.
3. The composition of claim 2 wherein the polyphenylene ether is poly(2,6-dimethyl-1,4-phenylene ether).
4. The composition of claim 2 wherein the polyamide is selected from the group consisting of polyamide 6; polyamide 6,6; polyamide 12; and polyamide 6/10.
5. The composition of claim 2 wherein the weight ratio of polyphenylene ether to polyamide is in the range of about 40:60 to about 60:40.
6. The composition of claim 1 wherein compatibilizing compound (C) is selected from the group consisting of
   (a) compounds which contain both (i) an ethylenic carbon-carbon double bond or a carbon-carbon triple bond and
      (ii) a carboxylic acid, acid anhydride, acid amide, imido, carboxylic ester, amino, or hydroxyl group;
   (b) liquid diene polymers;
   (c) epoxy compounds;
   (d) polycarboxylic acids or derivatives thereof;
   (e) an oxidized polyolefin wax;
   (f) a compound containing an acyl functional group;
   (g) a polyphenylene ether modified with a compound containing an acyl functional group; and
   (h) a chloroepoxytriazine compound
7. The composition of claim 6 wherein the compatibilizing agent is selected from the group consisting of maleic anhydride, maleic acid, fumaric acid, maleimide, and maleic hydrazide.
8. The composition of claim 6 wherein the compatibilizing agent is trimellitic anhydride acid chloride or polyphenylene ether modified with trimellitic anhydride acid chloride.
9. The composition of claim 6, wherein the polycarboxylic acid or derivative thereof is selected from the group consisting of citric acid, malic acid, and salts and hydrates thereof.
10. The composition of claim 1, further comprising a styrene resin selected from the group consisting of styrene homopolymers, styrene copolymers, rubber-modified polystyrene, and blends thereof.
11. The composition of claim 10 wherein the styrene resin is present in the composition at a level of about 1%-30% by weight, based on the weight of the entire composition.
12. The composition of claim 1, further comprising an elastomeric block copolymer.
13. The composition of claim 12, wherein the elastomeric block copolymer is a diblock or triblock copolymer of styrene and at least one olefin or conjugated diene, any conjugated diene block being non-hydrogenated or partially or entirely hydrogenated.
14. The composition of claim 13, wherein the block copolymer is present in the composition at a level of about 5%-20% by weight, based on the weight of the entire composition.
15. The composition of claim 14 wherein the block copolymer is a styrene-butadiene diblock or styrene-butadiene-styrene triblock copolymer.
16. The composition of claim 1, further comprising about 1% by weight to about 40% by weight glass fibers, based on the weight of the entire composition.
17. The composition of claim 1, further comprising effective amounts of a stabilizer which inhibits oxidation or thermal degradation of the composition.
18. The composition of claim 17 wherein the stabilizer is a hindered polyphenol.
19. The composition of claim 1 wherein the metal stearate is selected from the group consisting of zinc stearate, calcium stearate, aluminum stearate, cerium stearate, and magnesium stearate.
20. The composition of claim 1 wherein the amide is selected from the group consisting of stearamide, behenamide, oleamide, erucamide, stearyl erucamide, erucyl erucamide, oleyl palmitamide, stearyl stearamide, erucyl stearamide, N,N'-ethylenebisstearamide, and N,N'-ethylenebisoleamide.
21. The composition of claim 1 wherein the amide of component D(ii) is stearyl erucamide.
22. The composition of claim 21 wherein the metal stearate is zinc stearate.
23. The composition of claim 1 wherein the weight ratio of metal stearate to amide ranges from about 80:20 to about 60:40.
24. A thermoplastic composition comprising:
   (a) about 20%-50% polyphenylene ether resin;
   (b) about 20%-50% polyamide resin;
   (c) about 5%-20% elastomeric block copolymer;
   (d) about 0.1%-1.5% aliphatic polycarboxylic acid;
   (e) about 1%-20% styrene resin; and
   (f) about 0.05%-2.0% of an additive combination which consists essentially of at least one metal stearate and at least one amide selected from the group consisting of primary amides, secondary amides, and alkylenebisamides, each component in the composition measured in terms of percent-by-weight, based on the weight of the entire composition.

25. An improved method for extruding polyphenylene ether-polyamide compositions, comprising:
(a) admixing, in a molten state, at least one polyphenylene ether resin with at least one compatibilizing compound for polyphenylene ethers and polyamides; and
(b) adding to the extruder at least one polyamide resin along with an additive combination which itself comprises
   (i) at least one metal stearate, and
   (ii) at least one amide selected from the group consisting of primary amides, secondary amides, and alkylenebisamides;
said composition while in the extruder being subjected to a temperature in the range of about 250 degrees Centigrade to about 350 degrees Centigrade for a time period of about 10 seconds to about 30 seconds.

* * * * *